US012574224B2

(12) United States Patent
Rao et al.

(10) Patent No.: US 12,574,224 B2

(45) Date of Patent: Mar. 10, 2026

(54) SITE-TO-SITE TUNNEL AUTHENTICATION BY QUANTUM KEYS

(71) Applicant: UT-Battelle, LLC, Oak Ridge, TN (US)

(72) Inventors: Nageswara S. V. Rao, Oak Ridge, TN (US); Muneer Alshowkan, Oak Ridge, TN (US); Anees Al-Najjar, Knoxville, TN (US); Susan E. Hicks, Kingston, TN (US); Philip G. Evans, Clinton, TN (US); Joseph M. Lukens, Knoxville, TN (US); Nicholas A. Peters, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 298 days.

(21) Appl. No.: 18/501,512

(22) Filed: Nov. 3, 2023

(65) Prior Publication Data

US 2024/0154794 A1 May 9, 2024

Related U.S. Application Data

(60) Provisional application No. 63/422,756, filed on Nov. 4, 2022.

(51) Int. Cl.
H04L 9/40 (2022.01)
H04L 9/08 (2006.01)

(52) U.S. Cl.
CPC ............ H04L 9/0852 (2013.01); H04L 63/02 (2013.01)

(58) Field of Classification Search
CPC ....... H04L 9/0852; H04L 9/08; H04L 9/0861; H04L 63/08; H04L 63/062; H04L 63/0428; H04L 63/164; H04L 63/166; H04L 63/02; H04L 7/00; H04L 29/06; H04L 12/46; H04J 3/06; H04W 56/00; G06F 21/57; G06F 21/53; G06F 21/62; H04B 10/80

See application file for complete search history.

(56) References Cited

U.S. PATENT DOCUMENTS 11,791,994 B1 * 10/2023 Sinha ...................... H04L 63/06
2023/0269075 A1 * 8/2023 Bakopoulos .......... H04L 9/0819
713/171

OTHER PUBLICATIONS

Bennett, C. et al., "Quantum cryptography: Public key distribution and coin tossing", Theoretical Computer Science, 2014, pp. 7-11, vol. 560.

(Continued)

*Primary Examiner* — Brian F Shaw

(74) *Attorney, Agent, or Firm* — Scully, Scott, Murphy & Presser, P.C.

(57) ABSTRACT

A framework for authenticating firewall and encryption devices (FEDs) as endpoints of a secure tunnel using quantum-based secrets keys are provided. The secure tunnel is between two network sites. A quantum key distribution (QKD) subsystem is collocated, in part, with a first network site in another part, with a second network site. The QKD subsystem generates and shares at least one quantum-based secret key with respective key hosts in the first network site and second network site. Each FED obtains the same quantum-based secret key from the respective key host and authenticate each other as endpoints of the secure tunnel to be established between the first network site and the second network site through the public network. The authentication may be repeated.

20 Claims, 8 Drawing Sheets

(56)             References Cited

OTHER PUBLICATIONS

Choi, I. et al., "Field trial of a quantum secured 10 Gb/s DWDM transmission system over a single installed fiber", Opt Express, Sep. 2014, pp. 23121-23128, vol. 22, No. 19.

Lopez, D. et al., "Demonstration of Software Defined Network Services Utilizing Quantum Key Distribution Fully Integrated with Standard Telecommunication Network", Quantum Rep., 2020, pp. 453-458, vol. 2, No. 3.

Wang, S. et al., "Field and long-term demonstration of a wide area quantum key distribution network", Opt. Express, Sep. 2014, pp. 21739-21756, vol. 22, No. 18.

Evans, P. et al., "Trusted node QKD at an electrical utility", IEEE Access, 2021, pp. 105220-105229, vol. 9.

Alshowkan, M. et al., "Reconfigurable quantum local area network over deployed fiber", PRX Quantum, Oct. 2021, pp. 040304-1 to 040304-13, vol. 2.

Mason, A., "IPSec Overview Part Four: Internet Key Exchange (IKE)", Cisco Press, Feb. 22, 2002, pp. 1-5.

* cited by examiner

SITE-TO-SITE TUNNEL AUTHENTICATION BY QUANTUM KEYS

CROSS-REFERENCE TO RELATED APPLICATIONS

This application claims the benefit of U.S. Provisional Application No. 63/422,756, filed on Nov. 4, 2022, which is incorporated by reference herein in its entirety.

STATEMENT REGARDING FEDERALLY SPONSORED RESEARCH OR DEVELOPMENT

This invention was made with Government support under DE-AC05-00OR22725 awarded by US Department of Energy. The Government has certain rights to this invention.

FIELD OF THE DISCLOSURE

This disclosure relates to communications between two remote site networks via a secure tunnel over a public network. More particularly, the disclosure relates to systems and methods for authenticating endpoints of a secure tunnel using quantum secret key and subsequently establishing the secure tunnel via the authenticated endpoints at the two remote sites.

BACKGROUND

Organizations and facilities typically have multiple locations or sites. These sites may be geographically dispersed in different towns, cities, states, or countries. Each site may have its own communications network. This communications network may be a secured network. Each secured network may be protected from external networks by a local firewall such as using a firewall and encryption device (FED). A FED prevents unwanted access to the local secure network such as a local area network (LAN). However, for devices at remote sites to communicate with each other, they need to use a public network.

To prevent unwanted access to the communications over the public network between remote sites, it is now common to use a secure tunnel to communicate over the public network (which inherently is an insecure connection). The endpoints of the secure tunnel may be the FEDs. This secure tunnel effectively provides a virtual private network (VPN) to enable secure communications.

An example of a secure tunnel is an Internet Protocol Security (IPsec) tunnel. IPsec comprises a set of protocols for mutual authentication of the endpoints prior to the establishment of the tunnel (start of the session) and negotiation of security associations which includes private keys to be used to encrypt the traffic, e.g., session packets or network traffic.

Authentication is used to verify the identity of the endpoints of a perspective tunnel (each network site device) such as the respective endpoints. The authentication may use complicated digital certificates. Each network site may have installed or imported into the endpoints a digital certificate. The digital certificate may be generated by a certificate authority and imported into the FEDs. Two FEDs, at the ends of the secure tunnel, need to have an identical certificate. The certificate may rely on a public-key infrastructure. Authentication may also use pre-shared keys (PSK) such as private keys which are stored on the endpoints. The PSKs may be manually or automatically generated using conventional computing systems.

The PSKs must be securely shared between the endpoints such as through physical delivery. The PSKs may be manually input during the configuration stage of the secure tunnel. Once input, the PSK is rarely if ever changed under current practices.

SUMMARY

Accordingly, disclosed is a system for establishing an Internet Protocol Security (IPsec) tunnel through a public network. The tunnel is established between two network sites: a first network site and a second network site. The first network site has a first firewall and encryption device (FED) and a first key host communicatively coupled with the first FED through a first secure subnetwork. The second network site has a second FED and a second key host communicatively coupled with the second FED through a second secure subnetwork. The system comprises the first network site and the second network site and a quantum key distribution (QKD) subsystem collocated, in part, with the first network site and communicatively coupled with the first key host through the first secure subnetwork and, in another part, with the second network site and communicatively coupled with the second key host through the second secure subnetwork. The QKD subsystem is configured to produce at least one quantum-based secret key and share the at least one quantum-based secret key with the first key host and the second key host. Each FED is configured to obtain a same quantum-based secret key from their respective key hosts, authenticate each other as endpoints of the IPsec tunnel to be established between the first network site and the second network site through the public network, establish the IPsec tunnel having the first FED and the second FED as authenticated endpoints by setting up security associations, carry out encrypted network traffic between the first network site and the second network site through the established IPsec tunnel based on the security associations; and repeatedly reauthenticate each other as the endpoints of the IPsec tunnel based on new quantum-based secret keys obtained from their respective key hosts. The authenticating of the endpoints is based on the obtained same quantum-based secret key.

In an aspect of the disclosure, each quantum-based secret key has a unique identifier, The same quantum-based secret key may be determined using the unique identifier.

In an aspect of the disclosure, the reauthentication is on a periodic basis. For example, the first FED and the second FED may reauthenticate each other as the endpoints of the IPsec tunnel periodically. The repetition time for the reauthentication may be user-defined such as via a user interface. For example, the repetition time may be a multiple of a time for authenticating the endpoints.

In an aspect of the disclosure, the system may further comprise a means for synchronizing a timing at the first key host and the second key host or at the first FED and the second FED. This enables the same quantum-based secret key to be obtained by both FEDs at the same time. In an aspect of the disclosure, the first key host and the second key host simultaneously pushes the same quantum-based secret key to the first FED and the second FED, respectively.

In an aspect of the disclosure, the first FED and the first key host may be connected via a secure shell (SSH) connection and the second FED and the second key host may be connected via another SSH connection. In an aspect of the disclosure, the first key host may communicate with the first FED with an application program interface and the second key host may communicate with the second FED with an application program interface.

In an aspect of the disclosure, the QKD subsystem may be configured to repeatedly produce at least one additional quantum-based secret key, and share the at least one additional quantum-based secret key with the first key host and the second key host.

In an aspect of the disclosure, the first key host and the second key host may be configured to communicate with the respective parts of the QKD subsystem through an application programming interface.

In an aspect of the disclosure, encrypted network traffic may be exchanged while the endpoints of the IPsec tunnel are reauthenticated.

In an aspect of the disclosure, the keys hosts are physical separately from the IPsec tunnel using different ports. For example, the first key host is connected to a first physical port of the first FED through a first ethernet cable and the second key host is connected to a first physical port of the second FED through a second ethernet cable. The IPsec tunnel is formed between a second physical port of the first FED and a second physical port of the second FED. The first physical port is different from the second physical port.

In an aspect of the disclosure, network traffic may be transmitted between a first secure network and a second secure network. The first secure network may be located within the first network site and the second secure network may be located within the second network site. The first secure network and the second secure network may also be physically separated from the respective key hosts and the IPsec tunnel using different ports. For example, the first secure network may comprise a first router which is connected to a third physical port of the first FED. The second secure network may comprise a second router which is connected to a third physical port of the second FED. The third physical port may be different from the first physical port and the second physical port (at each FED).

In an aspect of the disclosure, the IPsec tunnel and/or the respective key hosts and/or the respective secure networks may be logically separated from each other. For example, the first FED may be configured for different security zones including a first security zone and a second security zone. The first security zone may comprise devices connected to the third physical port. The second security zone may comprise devices connected to the first physical port. The second FED may also be configured for different security zones including a first security zone and a second security zone. The first security zone may comprise devices connected to the third physical port. The second security zone may comprise devices connected to the first physical port. In an aspect of the disclosure, the different security zones may further comprise a third security zone comprising the IPsec tunnel (zone for the second physical port).

In an aspect of the disclosure, the parts of the QKD subsystem collocated at the respective first and second network sites may be connected to each other through a dedicated single-mode optical fiber.

In an aspect of the disclosure, the first network site and the second network site may be different locations of a same company, different locations of sensor networks, or different locations of data centers.

In an aspect of the disclosure, each key host may be configured to mark each quantum-based secret key as being used in a memory once the quantum-based secret key is obtained and restrict the quantum-based secret key from being reused.

DETAILED DESCRIPTION

In accordance with aspects of the disclosure, endpoints of a secure tunnel such as an Internet Protocol Security (IPsec) tunnel, may be authenticated using the same (identical) pre-shared quantum-based secret key also referred to as the quantum secret key or quantum key (QK). The IPsec tunnel may be established over a public network which is an insecure network. The IPsec tunnel may connect two remote sites (remote network sites). Each site may have its own secure network. Each secure network may have a firewall and encryption device (FED) which serves as the endpoint of the secure tunnel. An initial quantum key may be manually installed via a respective key host located within respective network site. In some aspects, new quantum keys may be simultaneously installed in the respective FEDs. The installation may be automatically done such as on a periodic basis. Similar to the initial quantum key, each new quantum key must be identical at both endpoints.

Remote sites (Network sites) used herein may refer to different buildings or facilities. The different buildings may be adjacent buildings, buildings in the same or different town(s) or same or different city(ies) or same or different state(s) or same or different country(ies). In some aspects, the network sites may be within the same building such on different floors or even on the same floor in different offices. The remote sites may be buildings or offices of a single company. For example, one of the buildings may be a home-office or headquarters of a company and other buildings or facilities may be satellite offices or regional offices. The remotes sites may be different buildings or facilities of a university, college or research facility such as a national lab (campus buildings). The network sites may include, but is not limited to, office networks, sensor networks, data center or repository networks, or instrument networks.

Figure 1:
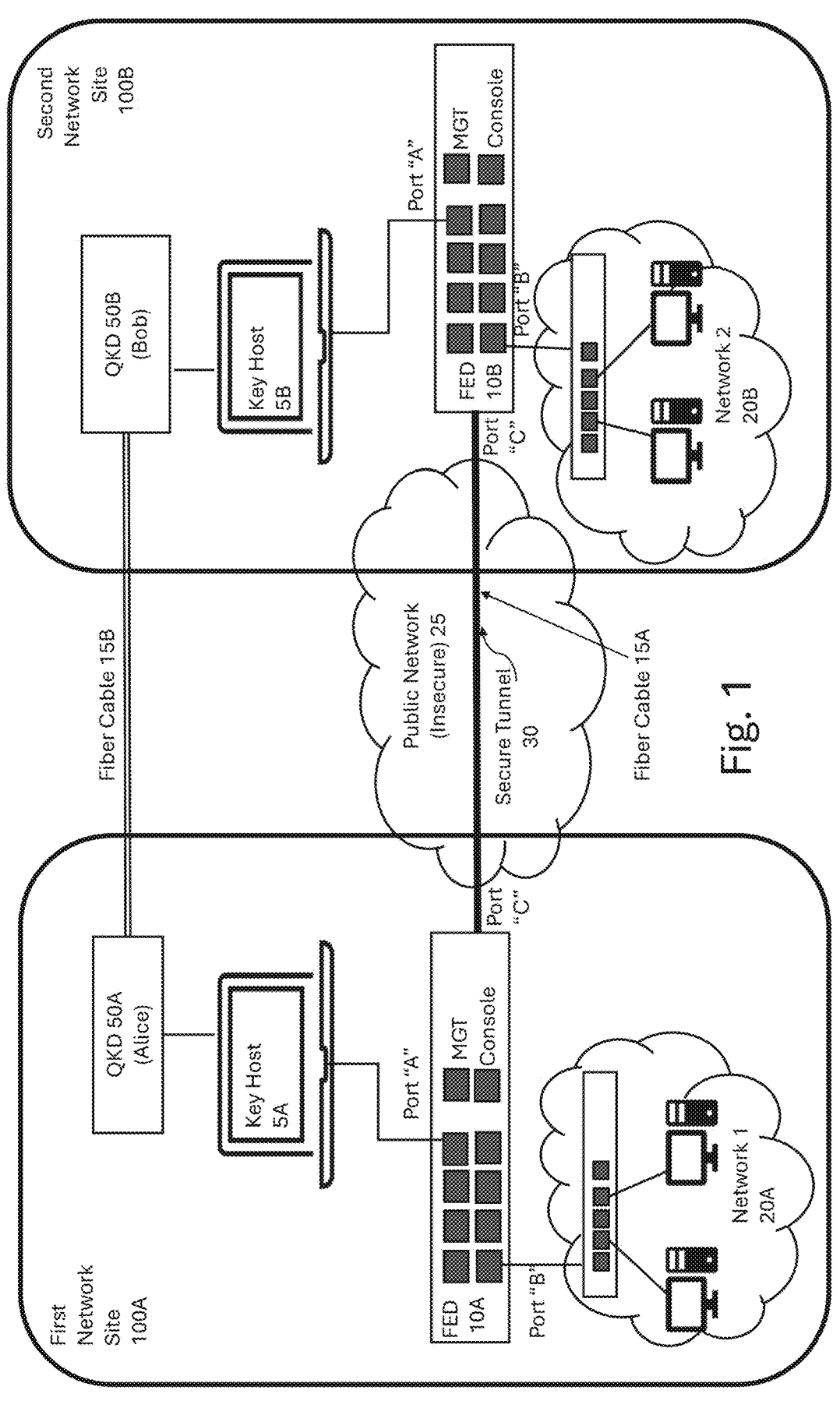
FIG. 1 illustrates an example of a site-to-site communication system using an established secure tunnel with authenticated endpoints in accordance with aspects of the disclosure.

FIG. 1 illustrates an example of a site-to-site communication system in accordance with aspects of the disclosure. In FIG. 1, there are two network sites: first network site 100A and second network site 100B, which are examples of remote sites. Each network site 100A, 100B has a respective network 20A, 20B (Network 1 and Network 2). Network 1 20A and Network 2 20B may be secure networks and implement an internet protocol (IP). Network 1 20A and Network 2 20B may comprise a host (host computer), network nodes and a router. For example, the host node and network nodes may be directly connected to the router via physical ports. The connections may be Ethernet connection (such as using Ethernet cable(s)). An Ethernet cable may be a multimode fiber cable or copper connection. Depending on the size of Network 1 20A and Network 2 20B, each may have multiple routers and switches. Two network devices (nodes) are connected to a router in FIG. 1 for illustrative purposes (at each network site 100A, 100B). However, the number of nodes is not limited to the illustrated example. Network 1 20A and Network 2 20B may be local area networks (LANs).

In other aspects, the router may be a wireless router and the network nodes may be connected wirelessly such as using Wi-Fi®. The network nodes may be desktop computers, supercomputers, sensors, instruments, storage devices or mobile devices such as laptops, mobile phones, tablets, etc. For purposes of the description, communication between these network nodes or between the host and network modes is referred to as site traffic such using a "classical channel".

In an aspect of the disclosure, Network 1 20A and Network 2 20B may be a combination of a wireless and wired technology.

Each network site 100A, 100B also has a firewall and encryption device (FED) 10A, 10B, respectively. FEDs 10A, 10B provide site firewalls which enable subnetworks on the site side (secure side) while providing connection to an open (insecure) network (on the insecure side) (Public Network 25). FEDs 10A, 10B may be obtained from different vendors such as Cisco Systems®, Fortinet Systems, Juniper Networks, Oracle and Palo Alto Network. For example, the FEDs 10A, 10B may be a Palo Alto PA-220 FED.

The FEDs 10A, 10B provide an application programming interface (API) with a user interface which enables an operator to set up security protocols for the FED (e.g., management of the firewall and encryption). For example, the security protocols include rules regarding monitoring and blocking/allowing incoming and/or outgoing traffics.

For the PA-220 FED, the API may be a part of the PAN-OS®.

Each FED 10A, 10B has a plurality of ports. Each of the plurality of ports is physically separated. Secure network (Network 1 20A) may be connected to Port "B" of the FED 10A and secure network (Network 2 20B) may be connected to Port "B" of the FED 10B. Port "B" may be the same port number in each FED 10A, 10B.

FEDs 10A, 10B (using the API) may be set up to establish a secure tunnel 30 between the first network site 100A and the second network site 100B, thereby enabling secure site-to-site communication. The secure tunnel 30 may also be referred to as virtual private network (VPN) tunnel herein. The secure tunnel 30 may be established over a public network. In an aspect of the disclosure, the secure tunnel 30 may be an IPsec tunnel. However, the secure tunnel 30 is not limited to IPsec.

The first network site 100A and the second network site 100B may be connected via "a wire" such as a fiber cable 15A. The fiber cable 15A may be a single-mode fiber (such as a long distance link). However, depending on the distance a multi-mode fiber cable may be used. In other aspects, a Cu-wire connection may be used. The fiber cable 15A may be connected to one of the ports of the FEDs 10A, 10B. The port that the fiber cable 15A is connected to is a different port from the port that the Network 1 20A and Network 2 20B are respectively connected. For example, the fiber cable 15A (site-to-site) may be connected to Port "C" in FEDs 10A, 10B. Port "C" may be the same port number on both FEDs. The different connections are to physically separate the traffic (packets) between the secure side (such as Network 1 20A and Network 2 20B) and the insecure side (public network 25).

In other aspects of the disclosure, the first network site 100A and the second network site 100B may be wirelessly connected. For example, the first network site 100A and the second network site 100B may be connected via Wi-Fi such as via a wireless router. Other free space channels may be used such as cellular. In an aspect of the disclosure, network site 100A,100B may have a wireless router where the wireless router is connected to the Port "C" in the FEDs, 10A, 10B, respectively.

The FEDs 10A, 10B are "endpoints" of the secure tunnel 30. In accordance with aspects of the disclosure, before the secure tunnel 30 is formally established, the endpoints need to be authenticated using a pre-shared quantum secret key (QK). In accordance with this aspect of the disclosure, the first network site 100A and the second network site 100B have components (portions) of a quantum key distribution system (QKD) system where QKD 50A is in the first network site 100A and QKD 50B is in the second network site 100B (collectively the "QKD system"). The portion in the first network site 100A may be also referred to as Alice and the portion in the second network site 100B may also be referred to as Bob. An off the shelf QKD system may be used. For example, an ID Quantique® QKD system may be used. The specific protocol for generating the quantum key may be QKD system-dependent. For example, decoy-state BB84 is the most well-known QKD protocol.

The QKD system generates and shares the quantum keys. For example, the QKD system implements an entanglement-based protocol. QKD 50A/50B comprises optical components including analyzers and detectors, for the single-photon measurement and the entanglement.

The quantum keys are shared using a dedicated channel (also referred to as the quantum channel). The quantum channel may be formed from two fiber cables 15B. These fiber cables 15B may be single-mode fiber cables. The fiber cables 15B may be above-ground or in-ground to avoid environmental factors. The environmental factors may include temperature changes and wind motion. These factors may impact the quantum key generation rate. The longer the distance between the first network site 100A and the second network site 100B, the greater the impact that the environment factors may have on the rate. The fiber cables 15B may be different than the fiber cables 15A used for the public network 25 (isolated).

Although not shown in FIG. 1, the sharing of the quantum key also includes some communication over "a classical authenticated channel" to verify the quantum key (in this case, the classical channel may be secured in advance for the exchange of information related to the quantum key).

In some aspects, while the communications may be isolated, the fiber cables 15A used for the public network 25 may be bundled with the fiber cables 15B used for the quantum channel.

Depending on the distance between the first network site 100A and the second network site 100B, the patch panel connectors and splices may be used. In some aspects, for longer distances, quantum repeaters may be used. In other aspects, for longer distances satellites may be used.

Each network site 100A, 100B also has a key host 5A, 5B, respectively. Key hosts 5A, 5B may be directly connected to the QKD 50A, 50B, respectively, such as shown in FIG. 1. The connection may be using an Ethernet cable. In other aspects, the key hosts 5A, 5B may be integral with the QKD 50A, 50B, respectively, such as shown in FIG. 2 depending on the QKD system.

The quantum keys generated and shared by the QKD system are made available to the respective key hosts 5A, 5B. Each key host 5A, 5B has the same quantum key(s) at the same time. The key hosts 5A, 5B has an API to interact with the QKD system.

In an aspect of the disclosure, each key host 5A, 5B is directly connected to a respective FED 10A, 10B via a port. The connection may be via an Ethernet cable. For example, the key hosts 5A, 5B may be connected to Port "A" of each FED 10A, 10B. Port "A" may be the same port number on both FEDs. Port "A" is a different physical port than Port "B" and Port "C". Therefore, the communications may be physically isolated.

Figure 2:
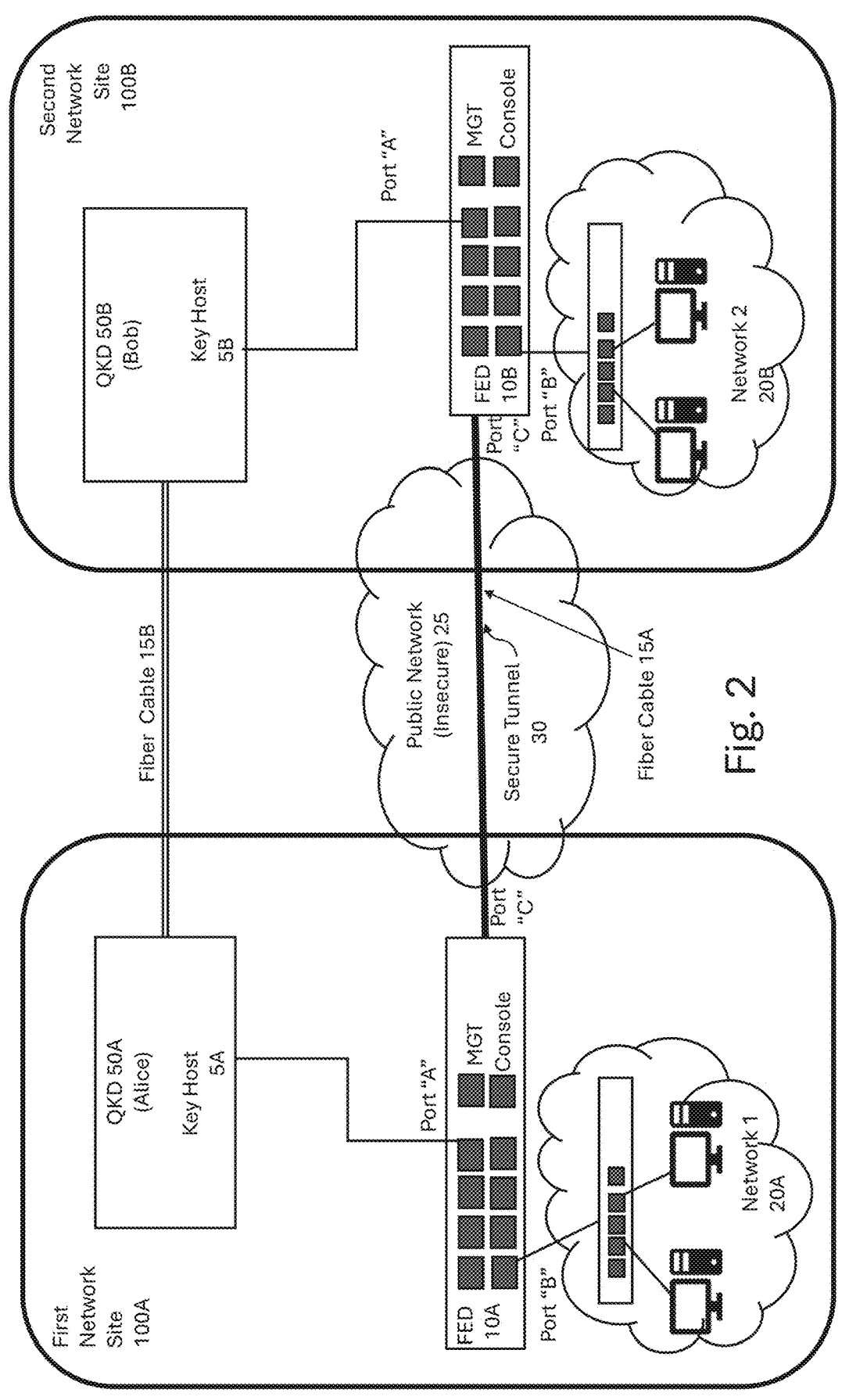
FIG. 2 illustrates another example of a site-to-site communication system using an established secure tunnel with authenticated endpoints in accordance with aspects of the disclosure.

When the key hosts 5A, 5B are integral with the QKD system (as shown in FIG. 2), QKD 50A may be directly connected to the FED 10A and QKD 50B may be directly connected to the FED 10B in a similar manner, i.e., cable into Port "A".

Port "A" may be referred to as the quantum key installation port.

QKD 50A and the key host 5A are connected via a first secure subnetwork (to the FED 10A). Similarly, QKD 50B and the key host 5B are connected via second secure subnetwork (to the FED 10B). Not only are the ports physically isolated for the first secure subnetwork, the secure network 1 20A (or secure network 2 20B) and the public network, such that the communications are physically isolated, in accordance with aspects of the disclosure, these ports may be logically isolated using different security zone set in the FEDs 10A, 10B. The different security zones may be set up using an API (management portion thereof) when the firewall is configured.

Figure 3:
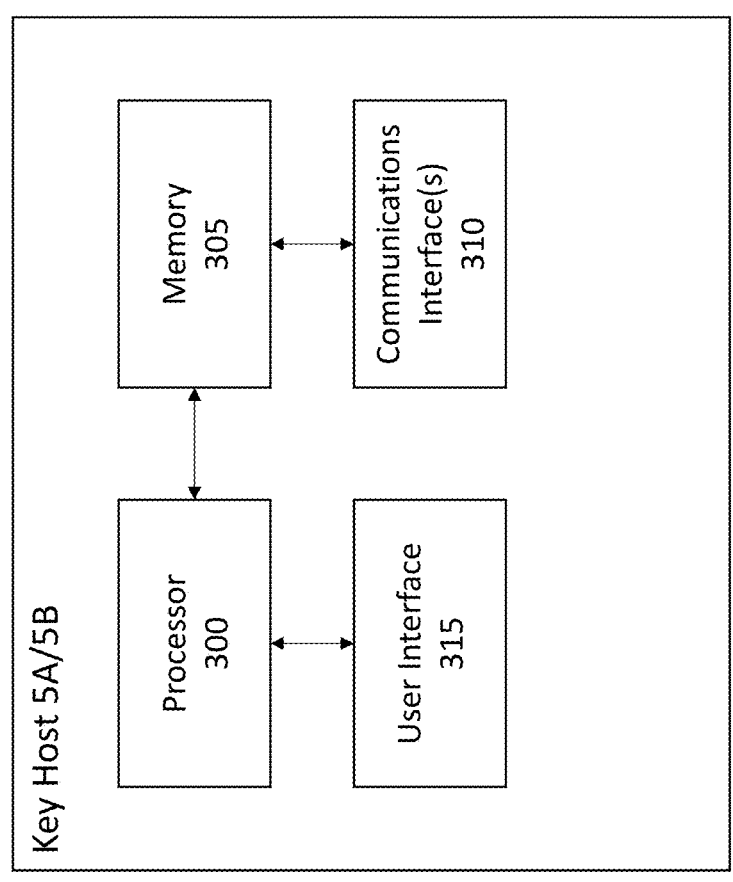
FIG. 3 illustrates a block diagram of a key host in accordance with aspects of the disclosure.

FIG. 3 illustrates a block diagram of the key hosts 5A, 5B in accordance with aspects of the disclosure. Each key host 5A, 5B has a processor 300. The processor 300 may be a CPU. In other aspects, the processor 300 may be a microcontroller or microprocessor or any other processing hardware such as a field programmable gate array (FPGA). The processor 300 may be configured to execute one or more programs stored in a memory (such as memory 305) to execute the functionality described herein. The one or more programs may be a combination of python codes and bash scripts.

The memory 305 may be configured to store one or more quantum keys receives from Alice 50A/Bob 50B.

The key hosts 5A, 5B also have communication interfaces 310 such as described above, e.g., Ethernet interfaces (ports for the cables) to connected with Alice 50A/Bob 50B and each FED 10A, 10B, respectively. The connection between Alice 50A/Bob 50B and the key hosts 5A, 5B, respectively, is not limited to Ethernet and may also be a serial interface such as via a USB interface (port).

The QKD system may share a quantum key having a specific key length. The specific key length may be unique to the QKD system used (type and/or brand). Additionally, the format of the quantum key may be QKD system specific (type and/or brand). The API installed in each key host 5A, 5B will recognize the format and be able to identify the key data. In response to the receipt of each quantum key from the QKD system, the processor 300 in each key host 5A, 5B may check key data of the quantum key for the appropriate length to avoid run-time errors caused by inadequate quantum key length.

If the key data of the quantum key is not the appropriate length, the processor 300 may ignore the quantum key and not store the key data in memory 305. In other aspects, if the processor 300 determines that the key data of the quantum key is not the appropriate length, the processor 300 may store the quantum key separately with a flag not to use. In some aspects, the processor 300 may keep a counter of the number of quantum keys received that do not have the appropriate length. This may be an indicator of some noise or interference within the quantum channel (fiber cable 15B). In some aspects, when the number of quantum keys that do not have the key data with the appropriate length exceeds a threshold, an investigation may be triggered. In other aspects of the disclosure, depending on the QKD system, the QKD system may emit a key generation failure error if the quantum error rate exceeds a threshold. For example, the QKD system may output only a single key bit of 0.

The FEDs 10A, 10B may require a specific key length for authentication. In other aspects, the specific key length may be user selected. The specific key length may be specific to FEDs 10A, 10B used. In an aspect of the disclosure, if the length of the key data received in the quantum key is longer than the specific key length used by the FEDs 10A, 10B, the processor 300 in each key host 5A, 5B may truncate the key data to the specific key length for the FEDs 10A, 10B. In this aspect, the processor 300 may only store the truncated key as the quantum key in the memory 305.

Each quantum key may be assigned a unique key identifier to identify the quantum key. This unique key identifier may be consecutive numbers. The quantum key (or truncated version thereof) may be stored in memory 305 in a data record associated with the unique key identifier.

The key hosts 5A, 5B may further comprise a user interface 315. The user interface 315 may be a display and a keyboard or keypad. In some aspects, the display may be a touchscreen. The key hosts 5A, 5B using the API of the QKD system are able to display on the user interface available quantum keys and the unique identifier (as well as a history of the quantum key such as use). This enables manual selection of a quantum key to be used for the authentication of the endpoints (FEDs 10A, 10B).

In an aspect of the disclosure, the key hosts 5A, 5B also have an API for the FEDs 10A, 10B, respectively, which may be used to configure the FEDs 10A, 10B including uploading the quantum key to the FEDs 10A, 10B via the quantum key installation port Port "A". For example, the key hosts 5A, 5B may utilize a dedicated FED account such as associated with the PAN-OS® (when the FED is a Palo Alto device). The FED account may also be used to set the security zones.

In order to facilitate the quantum key transfer, a secure shell (SSH) connection may be established between the key hosts 5A, 5B and its respective FED 10A, 10B (via the quantum key installation port Port "A"). In an aspect of the disclosure, the quantum key installation port Port "A" may be used to transfer the tunnel profile to the FEDs 10A, 10B.

The tunnel profile may include proposed security associations which is to be negotiated between the endpoints (FEDs 10A, 10B). A security association is used to establish shared parameters such as algorithms and keys for encrypting tunnel traffic once the tunnel is established. Different FEDs may support different algorithms and keys and therefore, the security association(s) may be device specific. For example, the encryption algorithms may include aes-256, aes-192, aes-128. The authentication may include sha512, sha384, sha256, sha1, md5. For the traffic encryption keys, a key size (and strength) may be selected. Additionally, the traffic encryption key durations may be set (lifespan). The key use duration may be set in terms of absolute time and/or traffic volume.

In an aspect of the disclosure, the same quantum key may be manually set by a user when the secure tunnel 30 is initially set up using the respective key host 5A, 5B (for the FEDs 10A, 10B). In other aspects, new quantum keys may be installed into the FEDs 10A, 10B while the secure tunnel 30 has already been established. In some aspects, these new quantum keys may be automatically installed at defined times within a tunnel age. In an aspect of the disclosure, the defined times may be on a periodic basis, e.g., at preset fixed time intervals. In this aspect of the disclosure, each key host 5A, 5B may be time synchronized. In some aspects, the time may be synchronized by global positioning system (GPS), precision time protocol (PTP) or network time protocol (NTP) or other device (an example of a means for synchronizing).

The periodic basis may be a function of the FEDs 10A, 10B used for the endpoints. Different FEDs (types and/or brand) may need longer for the installation of the quantum key and authentication process using the same. For example, the installation and authentication process for the PA-220 may be about 1 minute. Therefore, the period for the repeating the authentication process may be a multiple of the time needed for authentication (and installation). The time needed for installation and authentication is $T_{1A}$. The repetition period may be $5 \times T_{1A}$, $10 \times T_{1A}$, $20 \times T_{1A}$, $30 \times T_{1A}$, etc. In other aspects, the repetition time may be an absolute time irrespective of the installation and authentication time. For example, the repetition time may be 10 minutes, 30 minutes, 1 hour. The period may be set based on a desired security for the secure tunnel 30 and a tradeoff in the efficiency of the network traffic and security. The network traffic is exchanged using transmission control protocol (TCP). The reauthentication may be executed while network traffic is being exchanged. The TCP connection is maintained, which ensures that a majority of the applications and services will likely experience little to no interruption, however, the throughput (speed) may be lowered while the reauthentication process is being executed.

In an aspect of the disclosure, the QKD system may generate and share a plurality of quantum keys with each key host 5A, 5B prior to the establishment of the secure tunnel 30. The initial quantum key may be manually set into the respective FEDs 10A, 10B, such as by using the unique key identifier. Subsequently, the key hosts 5A, 5B may automatically install (push) a new quantum key with the next unique key identifier on the periodic basis (both key hosts 5A, 5B execute the installation of the identical key at the same time). The process is repeated periodically in sync.

Each time a quantum key is used, the key hosts 5A, 5B add a flag to the key record and the quantum key cannot be reused. When the number of unused quantum keys stored in memory 305 in the key hosts 5A, 5B are lower than a key number threshold, the key hosts 5A, 5B may cause the QKD system to generate and share additional quantum keys. The key number threshold may be based on the frequency of installing the new quantum keys. For example, the key number threshold may be 30 unused keys. However, the key number threshold is not limited to this number of keys and other numbers of keys may be used as the key number threshold. In other aspects, the quantum keys may be continuously generated by the QKD system (Alice 50A/50B) and shared with the key hosts 5A, 5B, which may eliminate a need for a threshold.

In other aspects of the disclosure, the QKD system may generate and share quantum keys via an on-demand basis: one quantum key at a time. Each time a new quantum key is needed, the key hosts 5A, 5B may cause the QKD system to generate and share a new quantum key.

In other aspects, instead of the key hosts 5A, 5B automatically installing (pushing) the new quantum keys to each FED 10A, 10B, respectively, the FEDs 10A, 10B may automatically pull the new quantum keys on a periodic basis. In this aspect, the FEDs 10A, 10B may be time synchronized as described above.

In an aspect of the disclosure, the initial quantum key may be automatically installed into the FEDs 10A, 10B.

In an aspect of the disclosure, the period for installing a new quantum key for authentication may be the same or different from the period for changing the traffic encryption key used to encrypt the network traffic and the renegotiation of the security associations.

In other aspects, the tunnel profile may be set on another device within the first network site 100A and/or the second network site 100B separate from the key hosts 5A, 5B. This other device may be "connected" to either the FEDs 10A, 10B or the key hosts 5A, 5B via a virtual network (secure subnetwork).

In accordance with aspects of the disclosure, the quantum keys, described above, are used to authenticate the endpoints (e.g., FEDs 10A, 10B) of a secure tunnel 30 (prior to and in some aspects, while the secure tunnel 30 is established). The authentication may be executed using one or more of the secure hash authentication (SHA) algorithms described above. For example, the quantum key may be the input to the SHA. The output of the SHA algorithm is a hash value. The hash value is transmitted in an authentication packet.

Figure 4:
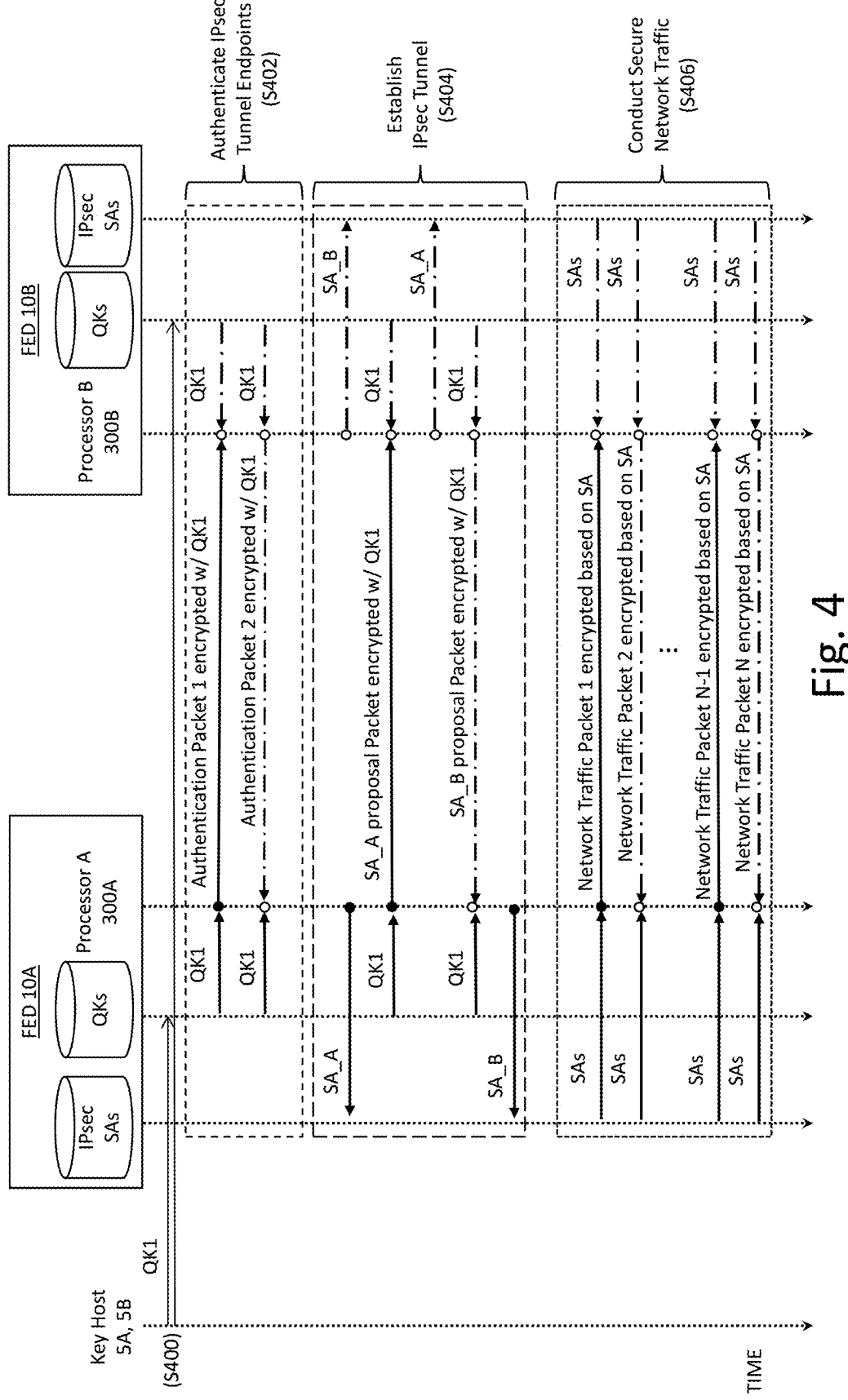
FIG. 4 illustrates a sequence diagram for authenticating endpoints using a quantum-based secret key, establishing a secure tunnel and carrying out network traffic using the established secure tunnel in accordance with aspects of the disclosure.

FIG. 4 illustrates a sequence diagram in accordance with aspects of the disclosure. The sequence includes authentication of the endpoints of the IPsec tunnel, establishing an IPsec tunnel and conducting secure network traffic within the established IPsec Tunnel. In each sequence diagram (FIGS. 4-6B), the different portions of the sequence are identified using separate brackets. The dotted lines with arrows at the end represent an example of the time of an action with respect to the vertex entity. While certain portions of the sequence may be executed simultaneously, to clearly show the portions in the sequences in FIGS. 4-6B, they are shown consecutively. The vertex entity is the component associated with the function. For example, the vertex entity may be the QKD system (Alice 50A/Bob 50B), the key hosts 5A, 5B and certain components of the FEDs 10A, 10B such as the processor (Processor A 300A and Processor B 300B) and memory 305 (which include storage for the quantum keys (QKs) and the IPsec security associations (SAs)).

For purposes of the description, the storage of the QKs and the IPsec SAs are shown separately, however, the information may be stored in the same memory 305.

The sequence begins with the QKD system 50A/50B generating and sharing a quantum key with the key hosts 5A, 5B (not shown in FIG. 4). The identical quantum key, such as QK1, is transferred from the key hosts 5A, 5B to the FEDs 10A, 10B, respectively, and stored in the memory (QKs) (S400). In an aspect of the disclosure, this transfer may be facilitated by a user as described above. To authenticate the endpoints, the respective processors 300A, 300B retrieves the quantum key (such as QK1) from the storage and generate an authentication packet (authentication packet 1 and authentication packet 2) at S402. Each authentication packet may include the hash value generated from QK1 as the input using one of the SHA algorithms. Authentication Packet 1 is transmitted from FED 10A to FED 10B via the public network 25. Authentication Packet 2 is transmitted from FED 10B to FED 10A via the public network 25 (or vice versa). The transmissions are shown as lines between processor A 300A and processor B 300B. In some aspects, the transmission of Authentication Packet 2 may be conditional on receipt of Authentication Packet 1 and determining that the input to the SHA was the QK1. Each respective device confirms whether the received quantum key after decrypting is the same as the stored quantum key (QK received=QK storage) (e.g., QK1). When they are the same, the endpoints of the IP tunnel are authenticated.

Other methods of authentication may be used. For example, post-quantum cryptography (PQC) protocols may be used. Certain of these protocols are described in Federal Information Processing Standards (FIPS), e.g., FIPS 203 (Module-Lattice-Based Key-Encapsulation Mechanism (KEM) Standard), FIPS 204 (Module-Lattice-Based Digital Signature Standard) and FIPS 205 (Stateless Hash-based Digital Signature Standard). Other examples may include NIST SP 800-56A Rev. 3, Recommendation for Pair-wise Key-Establishment Schemes Using Discrete Logarithm Cryptography or NIST SP800-56B Rev. 3, Recommendation for Pair-Wise Key-Establishment Using Integer Factorization Cryptography.

The authentication may be valid until the IPsec tunnel is terminated, e.g., a connection model.

Once the endpoints are authenticated, the IPsec tunnel 30 may be established using a proposed tunnel profile (S404). Each FED 10A, 10B transmits a proposal for the security associations based on a preset tunnel profile user input. Proposed security associations from FED 10A are referred to as SA_A. The processor A 300A stores the SA_A in the IPsec SAs (memory). Proposed security associations from FED 10B are referred to as SA_B. The processor B 300B stores the SA_B in the IPsec SAs (memory). The security associations may be established using the Internet Security Association and Key Management Protocol (ISAKMP).

FED 10A transmits a proposal packet with SA_A to FED 10B. Similarly, FED 10B transmits a proposal packet with SA_B to FED 10B. The transmissions are shown as lines between processor A 300A and processor B 300B. Typically, in known IPsec tunnels, the negotiation of the SA occurs prior to the tunnel being secured. Therefore, it is possible to discover the proposed SAs. In some aspects, to increase security and prevent interception and eavesdropping of the proposed SAs, the payload in the proposal packets may be encrypted with the quantum key such as the same quantum key used for authentication (e.g., QK1). However, since the encryption method for the secure tunnel 30 has not yet been negotiated, the FEDs 10A, 10B may use a default encryption method set in both FEDs 10A, 10B. Encryption using the quantum key is optional for increasing the security; and the encryption of the proposed SAs may not be used. When the quantum key is used for encryption in the establishment phase (S404), the respective processors (Processor A 300A and Processor B 300B) retrieve the quantum key (e.g., QK1) from the QKs storage in memory 305.

In FIG. 4 (and other sequence figures), the establishing of the IPsec tunnel is shown using the transmission of a packet from/to each FED 10A, 10B, for descriptive purposes only, however, in practice, a series of packet communications between FEDs 10A, 10B are needed. The series of packets may be in phases.

The agreed to security associations are referred to as "SAs" in the sequence figures. Once the SAs are agreed to, it "establishes" the secure tunnel 30 and the secure tunnel 30 is ready for network traffic. The network traffic either originates from Network 1 20A or Network 2 20B and is destined for the other (Network 2 20B or Network 1 20A). The network traffic is shown in FIG. 4 as a series of lines between the respective processors (Processor A 300A and Processor B 300B) of FEDs 10A, 10B (S406). For example, when a packet reaches FED 10A from Network 1 20A destine for a device in Network 2 20B, processor A 300A (in FED 10A) retrieves the SAs from the IPsec SAs storage and encrypts the payload using a key in the SAs and using the encryption method in the SAs. The key to encrypt the network traffic is different from the quantum key as described above. In some encryptions methods, the entire packet may be encrypted instead of the payload (only). Depending on the policy in the SAs, the same key may be used to encrypt all packets/payloads for the established IPsec tunnel. In other aspects, the SAs may comprise a plurality of keys, which may be used for encryption, where each key has a lifespan.

In an aspect of the disclosure, although not shown in FIG. 4, the SAs may be periodically renegotiated (repeat S404). The period for repetition may be defined in the agreed SAs. The period of repetition may be a fixed time period $\Delta T1$ or a fixed amount of data $D_{TH}$. In some aspect, network traffic may continue using the "old" SAs while the new SAs are being renegotiated. However, the throughput may be reduced.

Figure 5A:
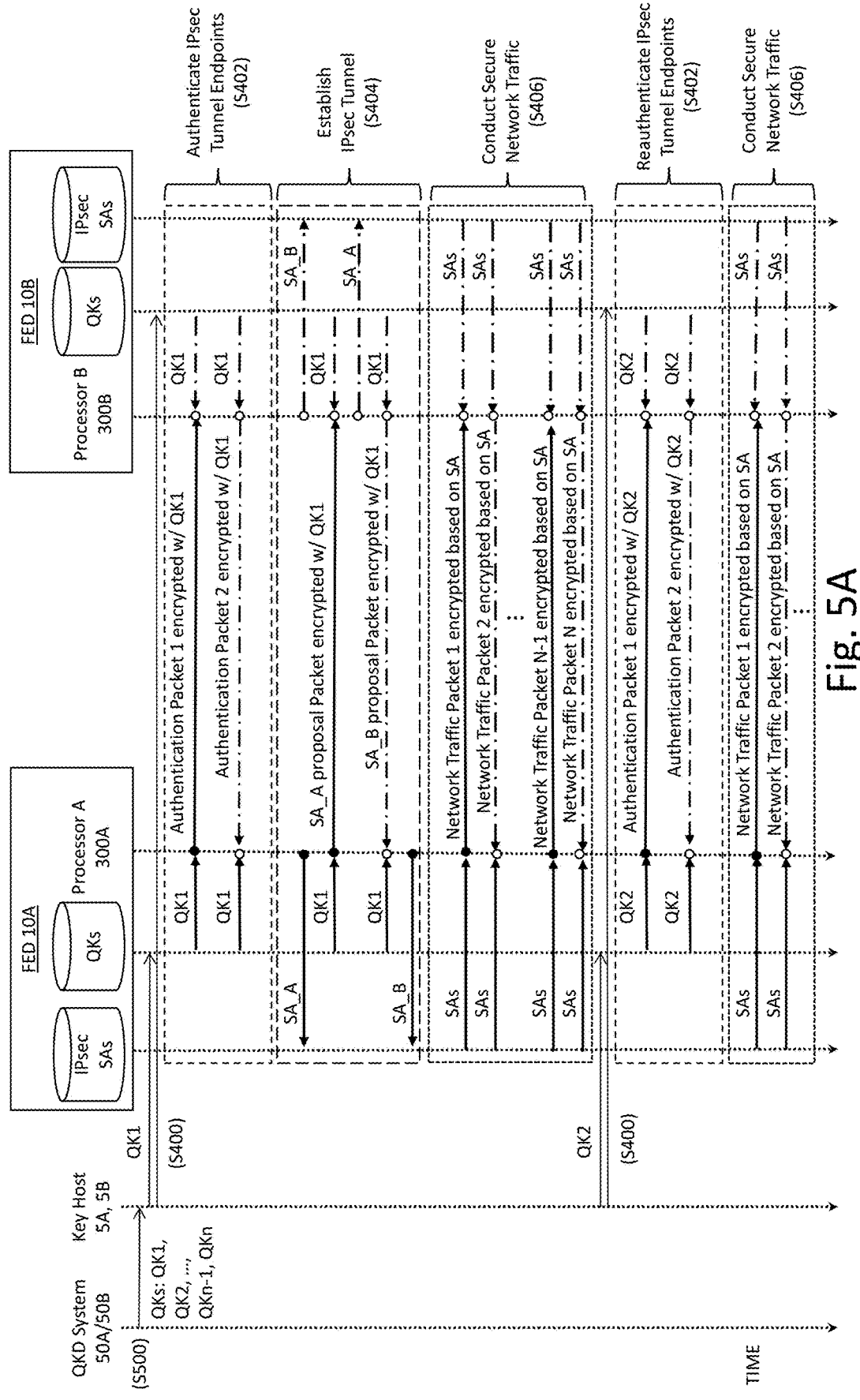
FIGS. 5A and 5B illustrate sequence diagrams for authenticating endpoints and reauthenticating the endpoints, establishing a secure tunnel using security associations and carrying out network traffic using the established secure tunnel in accordance with aspects of the disclosure where the reauthentication may be repeatedly executed with different quantum-based secret keys, where in FIG. 5A, a plurality of quantum-based secret keys are initially generated and subsequently used and where in FIG. 5B, quantum-based secret keys are made available in an on-demand basis.
Figure 5B:
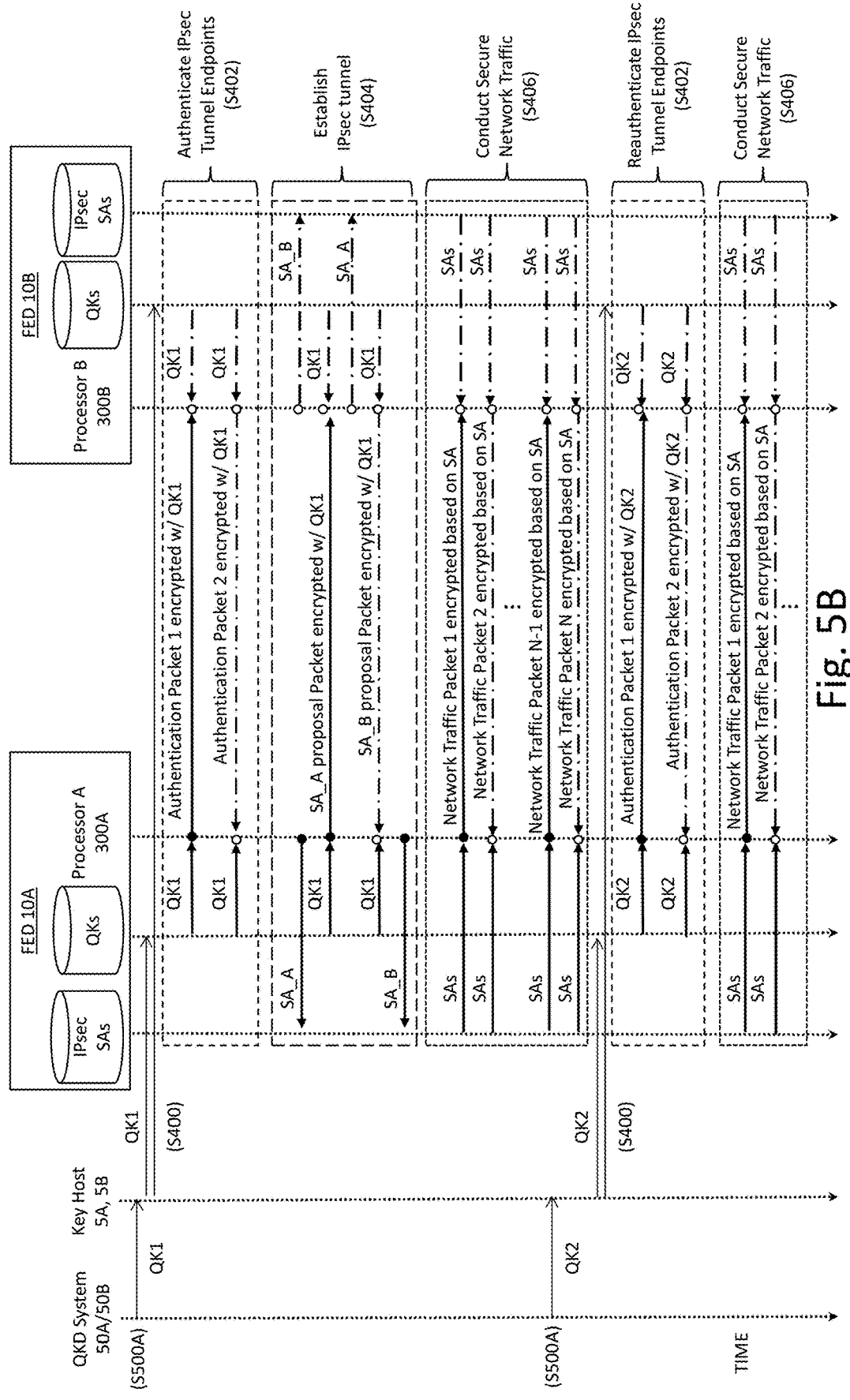

In an aspect of the disclosure, the authentication of the endpoints (e.g., FEDs 10A, 10B) is valid for a period. The period may be a fixed time period $\Delta T2$. Thus, the authentication (reauthentication) may be repeated (on a periodic basis) with different quantum keys such as shown in FIG. 5A or FIG. 5B. The difference between FIGS. 5A and 5B is that in FIG. 5A, the QKD system (50A/50B) generates and shares a plurality of quantum keys in advance (S500) and the key hosts 5A, 5B store a plurality of quantum keys which can be selected. In FIG. 5B, the QKD system (50A/50B) generates and shares the quantum keys in an on-demand fashion (S500A).

The initial quantum key (e.g., QK1) may be either manually installed using an API on the key hosts 5A, 5B or automatically installed where the key hosts 5A, 5B push the identical quantum key to the FEDs 10A, 10B or the FEDs 10A, 10B pull identical quantum key from the key hosts 5A, 5B. Subsequent quantum keys (e.g., QK2, QK3 . . . ) may be automatically installed in synchronization (by the key hosts 5A, 5B) into the FEDs 10A, 10B (or the FEDs, 10A, 10B pulling the quantum keys). For illustrative purposes, the reauthentication is shown between the conducting of the secure network traffic, however, quantum key installation and reauthentication of the endpoints may be done concurrently with the flow of the secure network traffic. The throughput may be affected by the installation and reauthentication, but as noted above, the TCP connection is maintained.

Figure 6A:
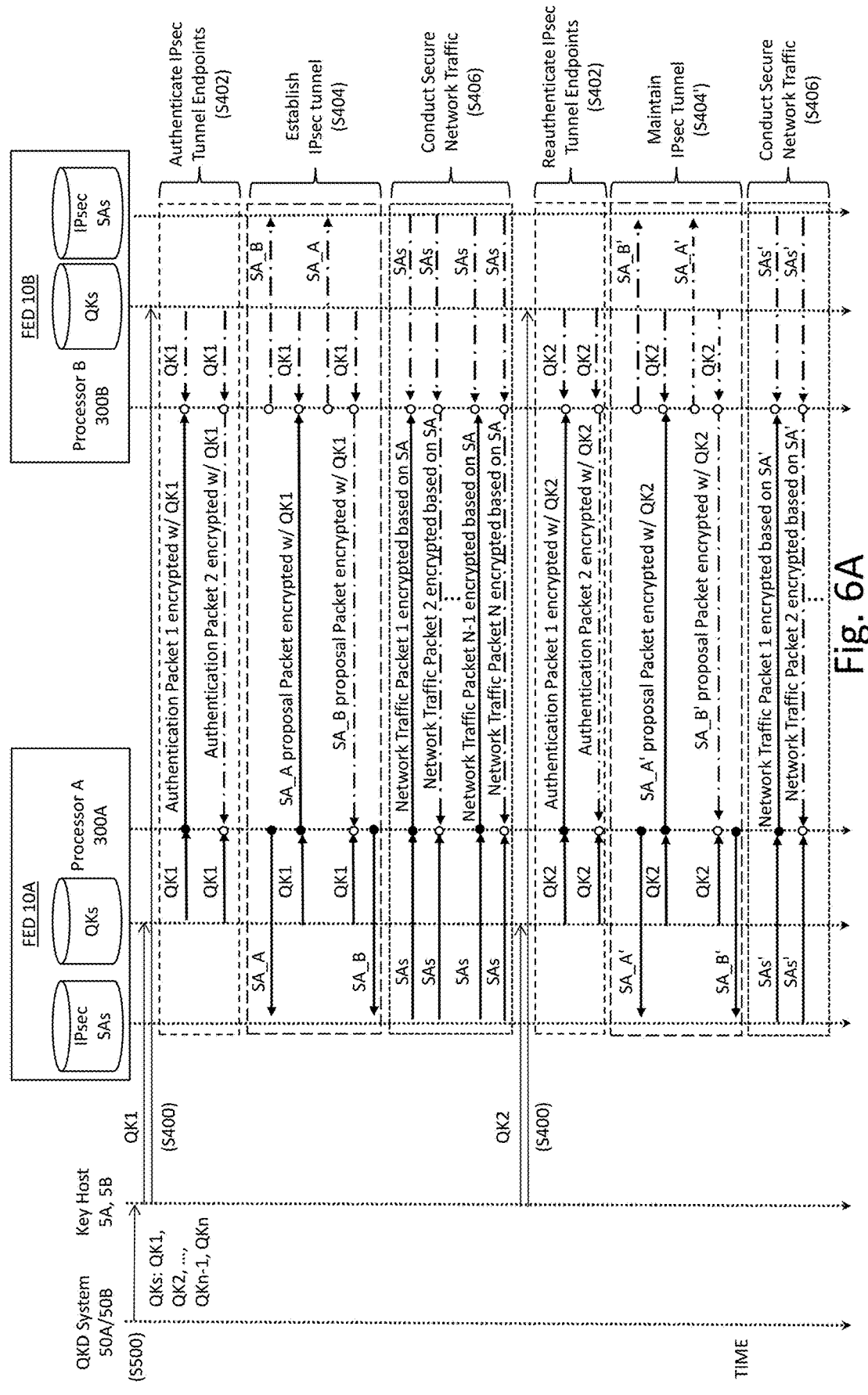
FIGS. 6A and 6B illustrate sequence diagrams for authenticating endpoints and reauthenticating the endpoints, establishing a secure tunnel using first security associations and maintaining with second security associations and carrying out network traffic using the established secure tunnel in accordance with aspects of the disclosure where the reauthentication may be repeatedly executed with different quantum-based secret keys, and where in FIG. 6A, a plurality of quantum-based secret keys are initially generated and subsequently used and where in FIG. 6B, quantum-based secret keys are made available in an on-demand basis.
Figure 6B:
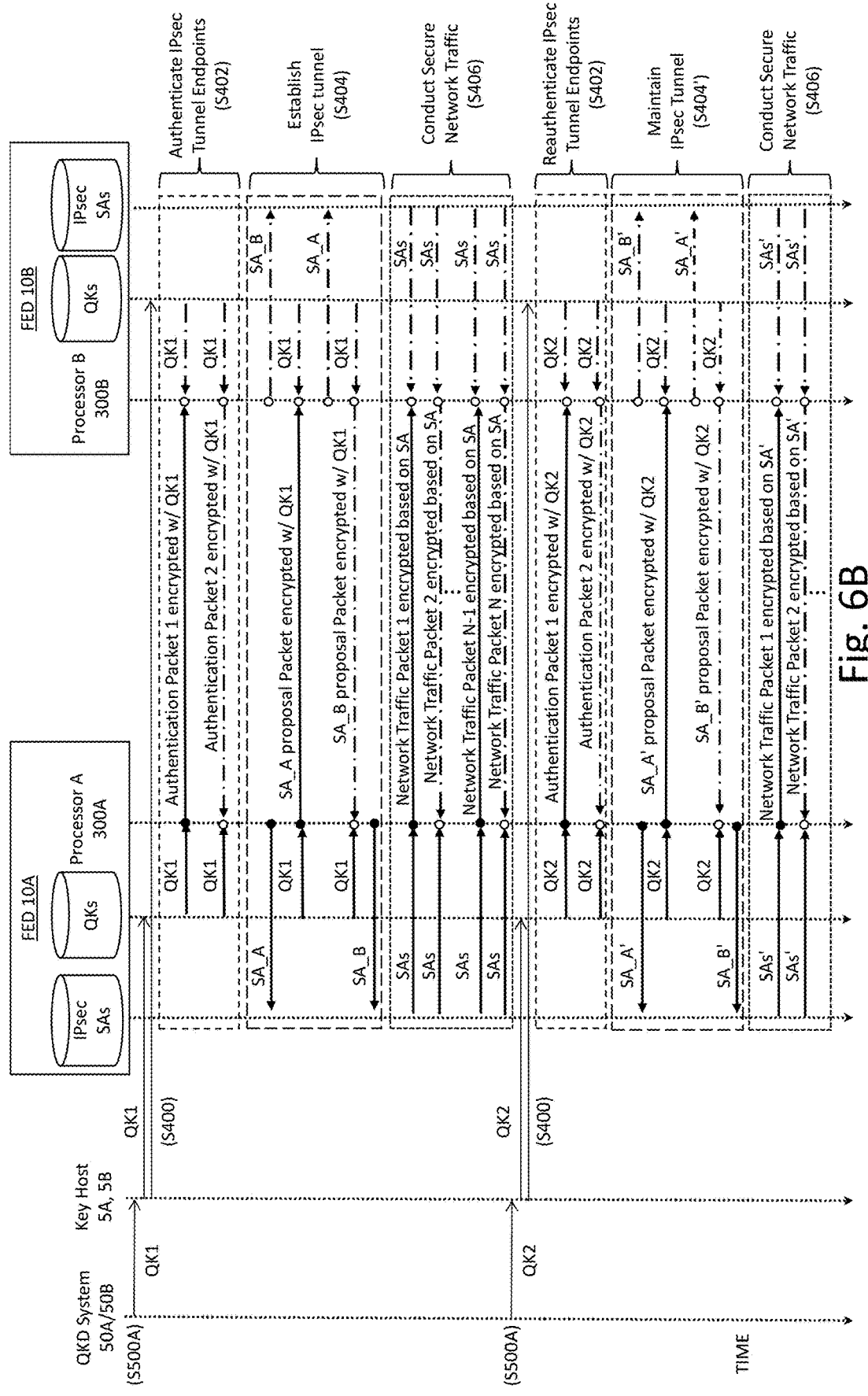

In an aspect of the disclosure, both the authentication of the endpoints and the renegotiation of the SAs may be repeated such as shown in FIGS. 6A and 6B (such as on a periodic basis. The period of repetition may or may not be the same. Similar to above, the difference between FIGS. 6A and 6B is that in FIG. 6A, the QKD system (50A/50B) generates and shares a plurality of quantum keys in advance (S500) and the key hosts 5A, 5B store a plurality of quantum keys which can be selected. In FIG. 6B, the QKD system (50A/50B) generates and shares the quantum keys in an on-demand fashion (S500A).

To distinguish between the original proposed security associations SA_A and SA_B and the new proposed security associations, a "'" is used such as SA_A' and SA_B'. Similarly, the initial agreed security associations are coined "SAs" whereas the new agreed security associations is coined "SAs'". Once again, for illustrative purposes, the reauthentication of the endpoints and renegotiations illustrates consecutively, however, they may occur concurrently while the TCP connection is maintained. But, as noted above, the throughput may be affected by the installation, authentication and renegotiation.

As used herein terms such as "a", "an" and "the" are not intended to refer to only a singular entity but include the general class of which a specific example may be used for illustration. As used herein, terms defined in the singular are intended to include those terms defined in the plural and vice versa.

References in the specification to "one aspect", "certain aspects", "some aspects" or "an aspect", indicate that the aspect(s) described may include a particular feature or characteristic, but every aspect may not necessarily include the particular feature, structure, or characteristic. Moreover, such phrases are not necessarily referring to the same aspect.

Aspects of the present disclosure may be implemented and run on a general-purpose computer or special-purpose computer system. The computer system may be any type known or will be known systems and may include a hardware processor, memory device, a storage device, input/output devices, internal buses, and/or a communications interface for communicating with other computer systems in conjunction with communication hardware and software, etc.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electromagnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The terms "computer system" and "network" as may be used in the present application may include a variety of combinations of fixed and/or portable computer hardware, software, peripherals, mobile, and storage devices. The computer system may include a plurality of individual components that are networked or otherwise linked to perform collaboratively, or may include one or more standalone components. The hardware and software components of the computer system of the present application may include and may be included within fixed and portable devices such as mobile phone, tablet, smartphone, desktop, laptop, and/or server. A module may be a component of a device, software, program, or system that implements some "functionality", which can be embodied as software, hardware, firmware, electronic circuitry, or etc.

As used herein, the term "processor" may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a "processor", may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually. For example, multiple processors may allow load balancing. As used herein, the term "processor" may be replaced with the term "circuit". The term "processor" may refer to, be part of, or include processor hardware (shared, dedicated, or group) that executes code and memory hardware (shared, dedicated, or group) that stores code executed by the processor.

In the description and claims herein, the term "about" indicates that the value listed may be somewhat altered, as long as the alteration does not result in nonconformance of the process or device. For example, for some elements the term "about" can refer to a variation of ±0.1%, for other elements, the term "about" can refer to a variation of ±1% or ±10%, or any point therein. For example, the term about when used for a measurement in mm, may include +/0.1, 0.2, 0.3, etc., where the difference between the stated number may be larger when the state number is larger. For example, about 1.5 may include 1.2-1.8, where about 20, may include 19.0-21.0.

Reference herein to any numerical range expressly includes each numerical value (including fractional numbers and whole numbers) encompassed by that range. To illustrate, reference herein to a range of "at least 50" or "at least about 50" includes whole numbers of 50, 51, 52, 53, 54, 55, 56, 57, 58, 59, 60, etc., and fractional numbers 50.1, 50.2 50.3, 50.4, 50.5, 50.6, 50.7, 50.8, 50.9, etc. In a further illustration, reference herein to a range of "less than 50" or "less than about 50" includes whole numbers 49, 48, 47, 46, 45, 44, 43, 42, 41, 40, etc., and fractional numbers 49.9, 49.8, 49.7, 49.6, 49.5, 49.4, 49.3, 49.2, 49.1, 49.0, etc.

The terminology used herein is for the purpose of describing particular aspects only and is not intended to be limiting the scope of the disclosure and is not intended to be exhaustive. Many modifications and variations will be apparent to those of ordinary skill in the art without departing from the scope and spirit of the disclosure.

What is claimed is:

1. A system for establishing an Internet Protocol Security (IPsec) tunnel through a public network, the system comprising:
   a first network site comprising a first firewall and encryption device (FED) and a first key host communicatively coupled with the first FED through a first secure subnetwork;
   a second network site comprising a second FED and a second key host communicatively coupled with the second FED through a second secure subnetwork; and
   a quantum key distribution (QKD) subsystem collocated, in part, with the first network site and communicatively coupled with the first key host through the first secure subnetwork and, in another part, with the second network site and communicatively coupled with the second key host through the second secure subnetwork, the QKD subsystem configured to:
      produce at least one quantum-based secret key; and
      share the at least one quantum-based secret key with the first key host and the second key host,
   wherein the first and second FEDs are configured to:
      obtain a same quantum-based secret key from their respective key hosts;
      authenticate each other as endpoints of the IPsec tunnel to be established between the first network site and the second network site through the public network, the authenticating being based on the obtained same quantum-based secret key;
      establish the IPsec tunnel having the first FED and the second FED as authenticated endpoints by setting up security associations;

carry out encrypted network traffic between the first network site and the second network site through the established IPsec tunnel based on the security associations; and
   repeatedly reauthenticate each other as the endpoints of the IPsec tunnel based on new quantum-based secret keys obtained from their respective key hosts.

2. The system of claim 1, wherein
   the first key host is connected to a first physical port of the first FED through a first ethernet cable,
   the second key host is connected to a first physical port of the second FED through a second ethernet cable, and
   the IPsec tunnel is formed between a second physical port of the first FED and a second physical port of the second FED, the first physical port being different from the second physical port.

3. The system of claim 1, wherein the first FED and the second FED are configured to reauthenticate each other as the endpoints of the IPsec tunnel on a periodic basis.

4. The system of claim 1, further comprising a means for synchronizing a timing at the first key host and the second key host or the first FED and the second FED.

5. The system of claim 1, wherein the first key host and the second key host are configured to communicate with the respective parts of the QKD subsystem through an application programming interface.

6. The system of claim 1, wherein the first FED and the first key host are connected via a secure shell (SSH) connection and the second FED and the second key host are connected via another SSH connection.

7. The system of claim 1, wherein the parts of the QKD subsystem collocated at the respective first and second network sites are connected to each other through a dedicated single-mode optical fiber.

8. The system of claim 1, wherein the QKD subsystem is configured to
   repeatedly produce at least one additional quantum-based secret key, and
   share the at least one additional quantum-based secret key with the first key host and the second key host.

9. The system of claim 2, wherein network traffic is transmitted between a first secure network and a second secure network, wherein the first secure network comprises a first router, the first router is connected to a third physical port of the first FED, and the second secure network comprises a second router, the second router is connected to a third physical port of the second FED, the third physical port being different from the first physical port and the second physical port.

10. The system of claim 9, wherein the first FED is configured for different security zones including a first security zone and a second security zone, the first security zone comprising devices connected to the third physical port and the second security zone comprising devices connected to the first physical port, and wherein the second FED is configured for different security zones including a first security zone and a second security zone, the first security zone comprising devices connected to the third physical port and the second security zone comprising devices connected to the first physical port.

11. The system of claim 10, where the different security zones further comprise a third security zone comprising the IPsec tunnel.

12. The system of claim 1, wherein encrypted network traffic is exchanged while the endpoints of the IPsec tunnel are reauthenticated.

13. The system of claim 1, wherein each quantum-based secret key has a unique identifier, wherein the same quantum-based secret key is determined using the unique identifier.

14. The system of claim 3, wherein a repetition time for the periodic basis is defined via a user interface.

15. The system of claim 14, wherein the repetition time is a multiple of a time for authenticating the endpoints.

16. The system of claim 1, wherein the first network site and the second network site are different locations of a same company.

17. The system of claim 1, wherein the first network site and the second network site are different locations of sensor networks or data centers.

18. The system of claim 1, wherein the first key host communicates with the first FED with an application program interface and the second key host communicates with the second FED with an application program interface.

19. The system of claim 4, wherein the first key host and the second key host simultaneously pushes the same quantum-based secret key to the first FED and the second FED, respectively.

20. The system of claim 1, wherein the first key host and the second key host are configured to mark each quantum-based secret key as being used in a memory once the quantum-based secret key is obtained and restrict the quantum-based secret key from being reused.

\* \* \* \* \*